(12) United States Patent
Chao

(10) Patent No.: US 7,455,255 B1
(45) Date of Patent: Nov. 25, 2008

(54) COMPUTER-ADAPTING AUTOMATIC WIRE COLLECTOR

(76) Inventor: Pin Chao, No. 41, Lane 5, Da Tong Rd., San-Xia Township, Taipei County (TW)

( * ) Notice: Subject to any disclaimer, the term of this patent is extended or adjusted under 35 U.S.C. 154(b) by 0 days.

(21) Appl. No.: 11/984,459

(22) Filed: Nov. 19, 2007

(51) Int. Cl.
*B65H 75/48* (2006.01)

(52) U.S. Cl. .................. 242/378.1; 242/385.4

(58) Field of Classification Search ......... 242/378, 242/378.1–378.3, 385, 385.4
See application file for complete search history.

(56) References Cited

U.S. PATENT DOCUMENTS

| | | | |
|---|---|---|---|
| 5,178,619 A * | 1/1993 | Galazaka | 606/41 |
| 6,866,218 B2 * | 3/2005 | Liao | 242/378.1 |
| 6,997,410 B1 * | 2/2006 | Huang | 242/378.3 |
| 7,147,177 B2 * | 12/2006 | Yen | 242/385.4 |
| 7,407,128 B1 * | 8/2008 | Chang | 242/385.4 |

* cited by examiner

*Primary Examiner*—Sang Kim
(74) *Attorney, Agent, or Firm*—Bacon & Thomas, PLLC

(57) ABSTRACT

The present invention relates to an application field for computer hardware, especially to a computer-adapting wire collector. It comprises a top cover; a bottom cover; a button, a spring; a positioning cover; a swirl-rotated spring, and a wire collecting stand. A buckle of each of the step-shaped extending tenon legs of the button along a circle direction is wedge-shaped buckle; the wire collecting stand comprises two corresponding upward wedge-shaped legs disposed at a circle of the wire collecting stand; the wedge-shaped buckle and a first side of the corresponding wedge-shaped leg of the wire collecting stand are against each other along with a relieving direction of the swirl-rotated spring.

3 Claims, 3 Drawing Sheets

COMPUTER-ADAPTING AUTOMATIC WIRE COLLECTOR

BACKGROUND

1. Related Field

The present invention relates to an application field for computer hardware, especially to a computer-adapting wire collector.

2. Prior Art

When the computer peripheral apparatuses, such as the mouse, keyboard, USB interface, are in use, it happens often to adjust the length of the connecting wire to a ideal length to use for a user. Therefore, a wire collector is adopted often to satisfy the need of the user. There are some drawbacks of the current wire collectors: the wire collector cannot function well in pull-and-stop when extending the computer-adapting wire; it happens sometime the extended wire cannot be fixed at the right position so as to repeat the extending action; the computer-adapting wire has to extend to the extreme length for totally collecting the wire; it happens sometimes to repeat the extending action for totally collecting the wire. It is very inconvenient to operate for a small space or messed wiring environment.

SUMMARY

An object of the present invention is to provide a computer-adapting wire collector to resolve the problems mentioned above.

To achieve the object mentioned above, a computer-adapting wire collector of the present invention comprising: a top cover; a bottom cover; a button, a spring; a positioning cover; a swirl-rotated spring, and a wire collecting stand; wherein the top cover and bottom cover are combined together by a plurality of positioning pillars; the positioning cover comprises two tenons; the positioning cover is combined with the top cover by the tenens; the button comprises two step-shaped extending tenon legs extending through an opening of the top cover and the positioning cover to be slidingly hooked inside the top cover; the spring is disposed between the top cover and the button; an inward extending pillar is disposed in the center of the top cover; a end of the extending pillar comprises an open-ended slot; the swirl-rotated spring disposed between the open-ended slot and a wire collecting stand establishes the wire collecting stand in the chamber formed by the top cover and the bottom cover; a buckle of each of the step-shaped extending tenon legs of the button along a circle direction is wedge-shaped buckle; the wire collecting stand comprises two corresponding upward wedge-shaped legs disposed at a circle of the wire collecting stand; the wedge-shaped buckle and a first side of the corresponding wedge-shaped leg of the wire collecting stand are against each other along with a relieving direction of the swirl-rotated spring wherein the first side of the corresponding wedge-shaped leg is thicker than a second side of the corresponding wedge-shaped leg.

The wire collecting stand comprises a gap used for a computer-adapting wire.

There is an in/out aperture for a computer-adapting wire for a body formed by combining the top cover and the bottom cover.

The advantageous effect of the present invention is: for the computer-adapting wire collector comprising a top cover, bottom cover, button, spring, positioning cover, and swirl-rotated spring, the wedge-shaped buckle of the button and the thicker side of the corresponding wedge-shaped leg of the wire collecting stand are against each other along with a relieving direction of the swirl-rotated spring; during the wire extending process, the swirl-rotated spring is contracted; wedge-shaped buckle of the button and the thinner side of the wedge-shaped leg of the wire collecting stand can be pulled apart due to the action of the spring; when they are pulled apart to a proper distance, the wedge-shaped buckle of the button and the thicker side of the wedge-shaped leg of the wire collecting stand are against each other to stop the wire extending in a manner of inverse hooking; when the button is pressed down, the wedge-shaped buckle of the button and the wedge-shaped leg of the wire collecting stand are get rid of constrain; the computer-adapting wire is collected when the swirl-rotated spring is relieved; when the wire is collected to the proper length, the button is not pressed down so that the wedge-shaped buckle of the button is reset to prevent the wedge-shaped leg of the wire collecting stand from reversing. The present invention can be used to adjust the length of the computer-adapting wire at will. During the wire collecting, the wire collecting can be stopped at any moment. It can be operated easily, and the structure is simple.

PREFERRED EMBODIMENTS OF THE PRESENT INVENTION

The present invention is further described in detail accompanying with the attached drawings.

Figure 1:
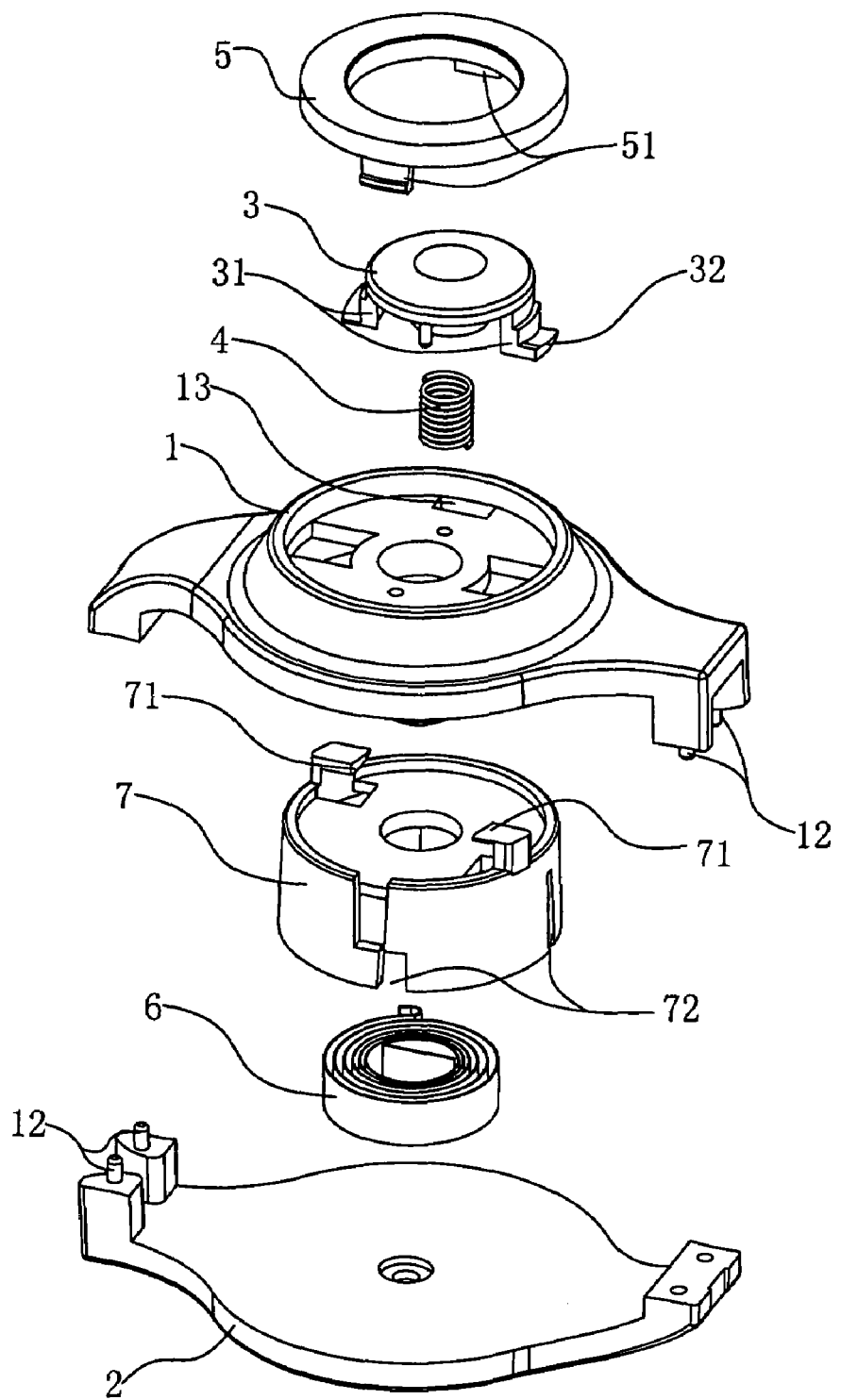
FIG. 1 is the analytic structure diagram of the present invention.
Figure 2:
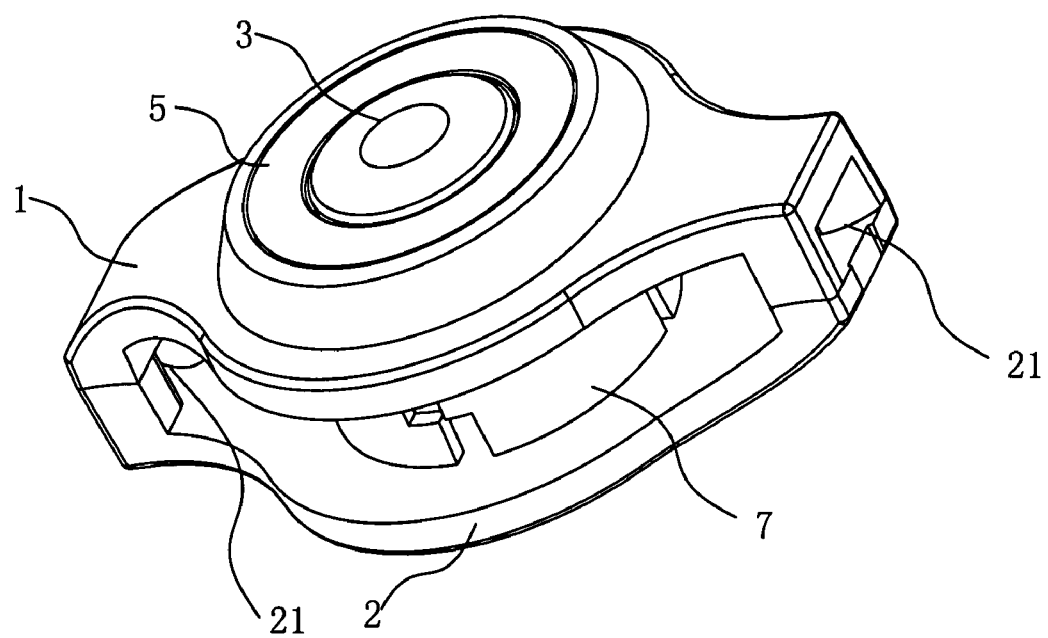
FIG. 2 is the structure diagram of the present invention.
Figure 3:
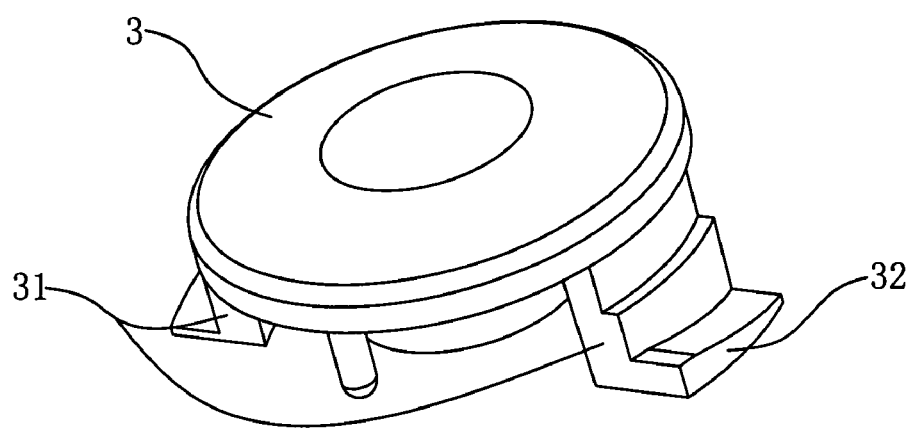
FIG. 3 is the structure diagram of the button of the present invention.
Figure 4:
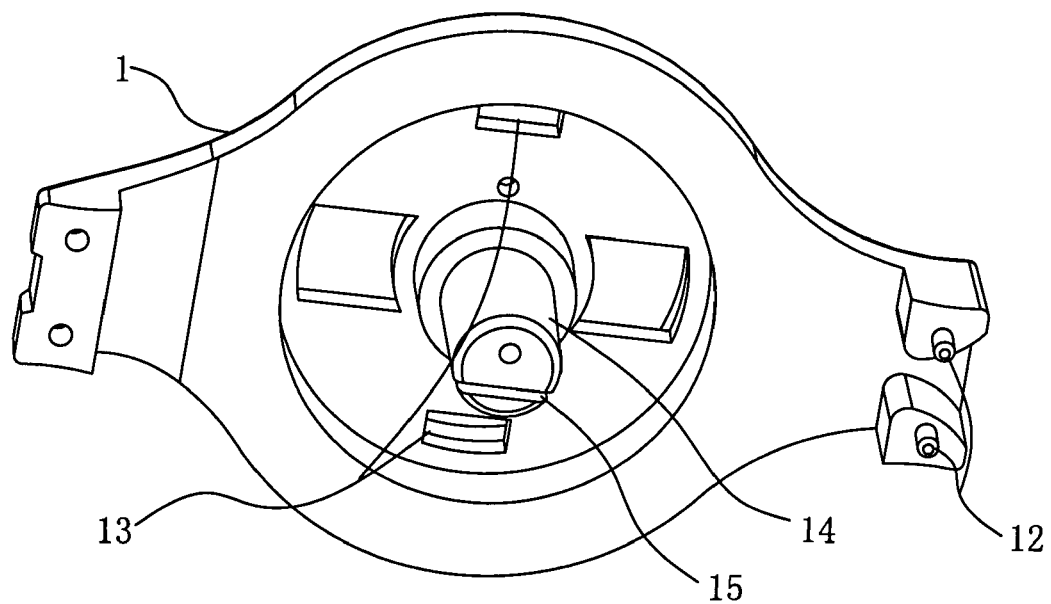
FIG. 4 is the structure diagram of the top cover of the present invention.
Figure 5:
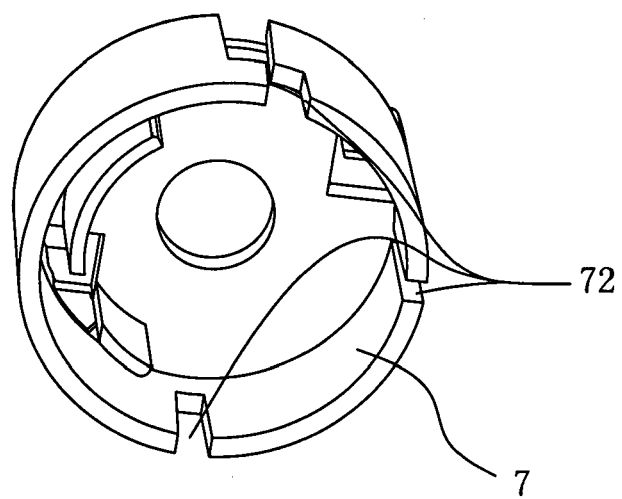
FIG. 5 is the structure diagram of the wire collecting stand of the present invention.

Referring to FIGS. 1-5, a computer-adapting wire collector of the present invention comprises: a top cover 1; a bottom cover 2; a button 3, a spring 4; a positioning cover 5; a swirl-rotated spring 6, and a wire collecting stand 7; wherein the top cover 1 and bottom cover 2 are combined together by a plurality of positioning pillars 12; the positioning cover 5 comprises two tenons 51; the positioning cover 5 is combined with the top cover 1 by the tenens 51; the button 3 comprises two step-shaped extending tenon legs 31 extending through an opening 13 of the top cover 1 and the positioning cover 5 to be slidingly hooked inside the top cover 1; the spring 4 is disposed between the top cover 1 and the button 3; an inward extending pillar 14 is disposed in the center of the top cover 1; a end of the extending pillar 14 comprises an open-ended slot 15; the swirl-rotated spring 6 disposed between the open-ended slot 15 and a wire collecting stand 7 establishes the wire collecting stand 7 in the chamber formed by the top cover 1 and the bottom cover 2; a buckle 32 of each of the step-shaped extending tenon legs 31 of the button 3 along a circle direction is wedge-shaped buckle 32; the wire collecting stand 7 comprises two corresponding upward wedge-shaped legs 71 disposed at a circle of the wire collecting stand 7; the wedge-shaped buckle 32 of the button 3 and the thicker side of the corresponding wedge-shaped leg 71 of the wire collecting stand 7 are against each other along with a relieving direction of the swirl-rotated spring 6. The wire collecting stand 7 comprises a gap 72 used for a computer-adapting wire. There is an in/out aperture 21 for a computer-adapting wire for a body formed by combining the top cover 1 and the bottom cover 2.

The wedge-shaped buckle 32 of the button 3 and the thicker side of the corresponding wedge-shaped leg 71 of the wire collecting stand 7 are against each other along with a relieving direction of the swirl-rotated spring 6; during the wire extending process, the swirl-rotated spring 6 is contracted; wedge-shaped buckle 31 of the button 3 and the thinner side of the wedge-shaped leg 71 of the wire collecting stand 7 can be pulled apart due to the action of the spring; when they are pulled apart to a proper distance, the wedge-shaped buckle 31 of the button 3 and the thicker side of the wedge-shaped leg 71 of the wire collecting stand 7 are against each other to stop the wire extending in a manner of inverse hooking; when the button 3 is pressed down, the wedge-shaped buckle 31 of the button 3 and the wedge-shaped leg 71 of the wire collecting stand 7 are get rid of constrain; the computer-adapting wire is collected when the swirl-rotated spring 6 is relieved; when the wire is collected to the proper length, the button 3 is not pressed down so that the wedge-shaped buckle 31 of the button 3 is reset to prevent the wedge-shaped leg 71 of the wire collecting stand 7 from reversing. The present invention can be used to adjust the length of the computer-adapting wire at will. During the wire collecting, the wire collecting can be stopped at any moment. It can be operated easily, and the structure is simple.

The above embodiments are just the preferred embodiments. They are not intended to limit the scope of the claimed invention. The equivalent alternation or modification according to the structure, feature, and concept of the present invention are all included in the scope of the claimed invention.

What is claimed is:

1. A computer-adapting automatic wire collector comprising:
   a top cover;
   a bottom cover;
   a button, a spring;
   a positioning cover;
   a swirl-rotated spring; and
   a wire collecting stand;
   wherein the top cover and bottom cover are combined together by a plurality of positioning pillars; the positioning cover comprises two tenons; the positioning cover is combined with the top cover by the tenens; the button comprises two step-shaped extending tenon legs extending through an opening of the top cover and the positioning cover to be slidingly hooked inside the top cover; the spring is disposed between the top cover and the button; an inward extending pillar is disposed in the center of the top cover; a end of the extending pillar comprises an open-ended slot; the swirl-rotated spring disposed between the open-ended slot and the wire collecting stand establishes the wire collecting stand in the chamber formed by the top cover and the bottom cover; a buckle of each of the step-shaped extending tenon legs of the button along a circle direction is wedge-shaped buckle; the wire collecting stand comprises two corresponding upward wedge-shaped legs disposed at a circle of the wire collecting stand; the wedge-shaped buckle of the button and a first side of the corresponding wedge-shaped leg of the wire collecting stand are against each other along with a relieving direction of the swirl-rotated spring wherein the first side of the corresponding wedge-shaped leg is thicker than a second side of the corresponding wedge-shaped leg.

2. The computer-adapting automatic wire collector according to claim 1, wherein the wire collecting stand comprises a gap for a computer-adapting wire.

3. The computer-adapting automatic wire collector according to claim 1, wherein there is an in/out aperture for a computer-adapting wire for a body formed by combining the top cover and the bottom cover.

* * * * *